(12) United States Patent
Ohyama et al.

(10) Patent No.: US 8,810,742 B2
(45) Date of Patent: Aug. 19, 2014

(54) DISPLAY APPARATUS AND VARIABLE LENS ARRAY

(75) Inventors: Tsuyoshi Ohyama, Tokyo (JP); Daisuke Takama, Kanagawa (JP)

(73) Assignee: Japan Display West, Inc., Aichi-Ken (JP)

( * ) Notice: Subject to any disclaimer, the term of this patent is extended or adjusted under 35 U.S.C. 154(b) by 0 days.

(21) Appl. No.: 13/527,840

(22) Filed: Jun. 20, 2012

(65) Prior Publication Data

US 2013/0002995 A1  Jan. 3, 2013

(30) Foreign Application Priority Data

Jun. 28, 2011 (JP) .................................. 2011-142783

(51) Int. Cl.
*G02F 1/13363* (2006.01)
*G02F 1/1337* (2006.01)
*G02B 27/22* (2006.01)

(52) U.S. Cl.
USPC ............. 349/15; 349/117; 349/124; 349/129; 349/200; 359/464

(58) Field of Classification Search
USPC ............... 349/15, 95, 117, 200, 96, 124, 129; 359/463, 464, 465, 619, 620, 489.07; 348/59; 428/1.3, 1.31
See application file for complete search history.

(56) References Cited

U.S. PATENT DOCUMENTS

| 7,532,272 B2 * | 5/2009 | Woodgate et al. ............ 349/95 |
| 2010/0026920 A1 * | 2/2010 | Kim et al. ..................... 349/15 |
| 2010/0157032 A1 * | 6/2010 | Park et al. ..................... 348/57 |
| 2011/0122128 A1 * | 5/2011 | Akita ............................. 345/419 |
| 2012/0218490 A1 * | 8/2012 | Takama et al. ................ 349/57 |
| 2012/0307169 A1 * | 12/2012 | Ohyama et al. ............... 349/33 |
| 2013/0002970 A1 * | 1/2013 | Baek et al. .................... 349/5 |

FOREIGN PATENT DOCUMENTS

| JP | 07-072445 | 3/1995 |
| JP | 2004-258631 A | 9/2004 |
| JP | 2009-237461 A | 10/2009 |

OTHER PUBLICATIONS

Japanese Office Action issued Mar. 4, 2014 for corresponding Japanese Application No. 2011-142783.

* cited by examiner

*Primary Examiner* — Dung Nguyen
*Assistant Examiner* — Tai Duong
(74) *Attorney, Agent, or Firm* — Rader, Fishman & Grauer PLLC

(57) ABSTRACT

A display apparatus includes: a display unit that displays a two-dimensional image; and a variable lens array disposed to face the display unit, wherein the variable lens array includes a variable phase difference layer that receives incident linearly polarized light polarized in a first direction and allows the linearly polarized light polarized in the same direction to exit or allows linearly polarized light polarized in a second direction switched from the first direction and different therefrom to exit, and an optically anisotropic layer that receives the light having exited out of the variable phase difference layer and works as a lens array for one of the light polarized in the first direction and the light polarized in the second direction whereas working as a transparent layer for the other light.

7 Claims, 16 Drawing Sheets

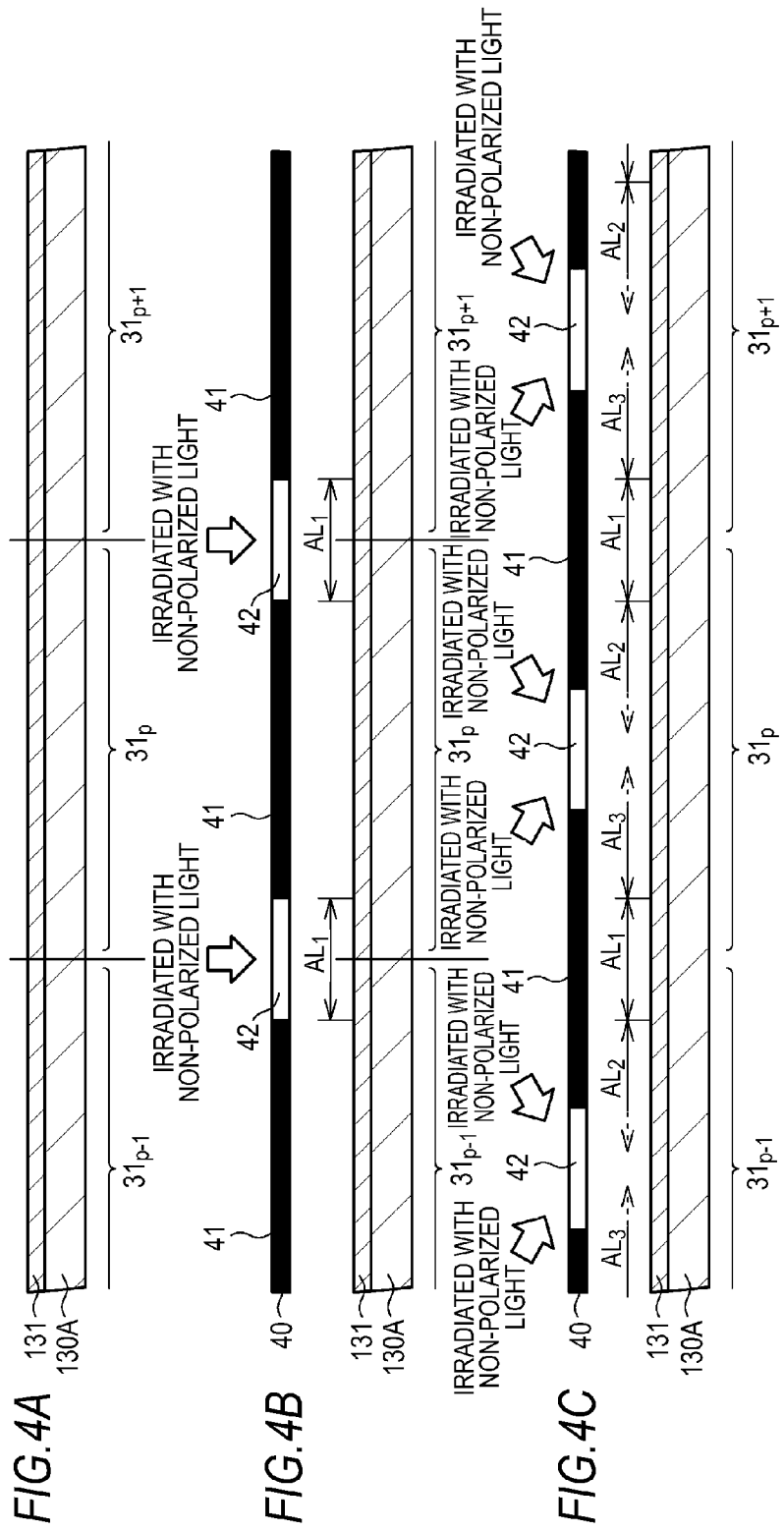

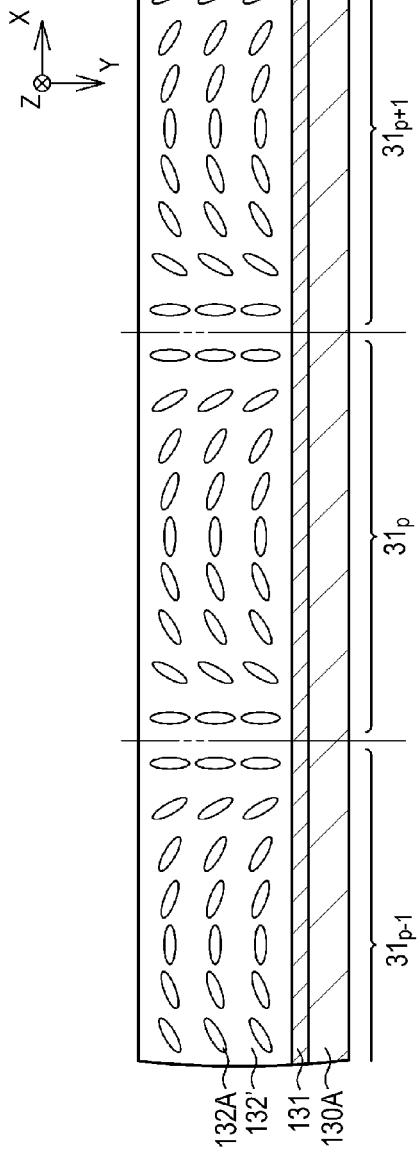
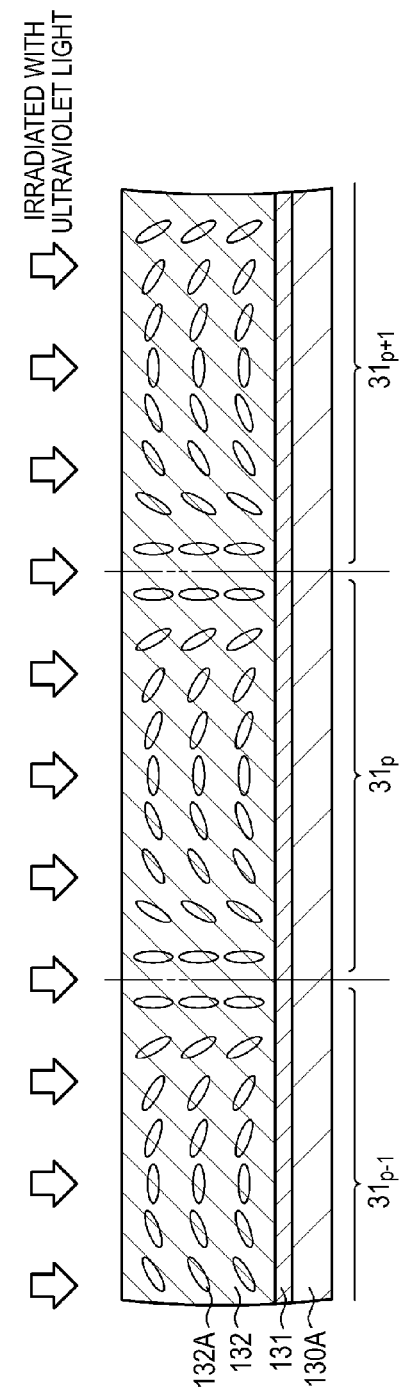

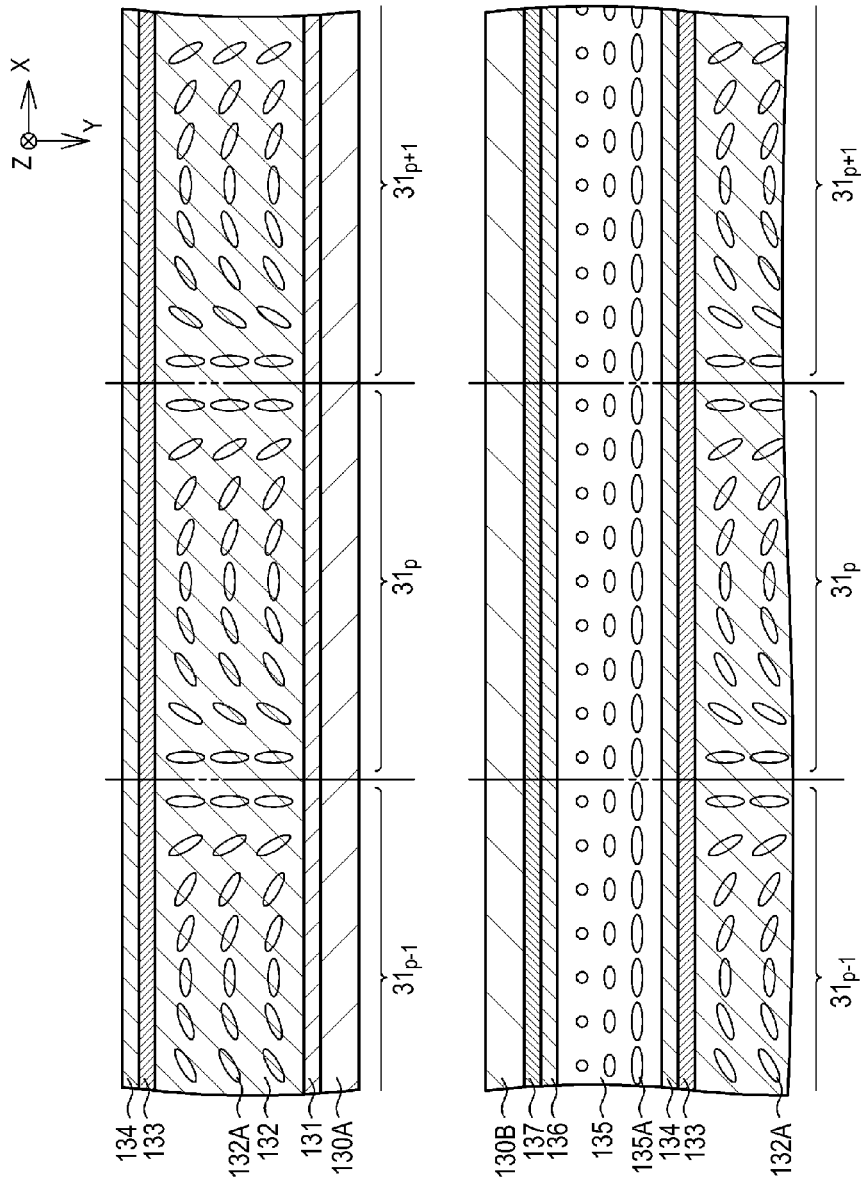

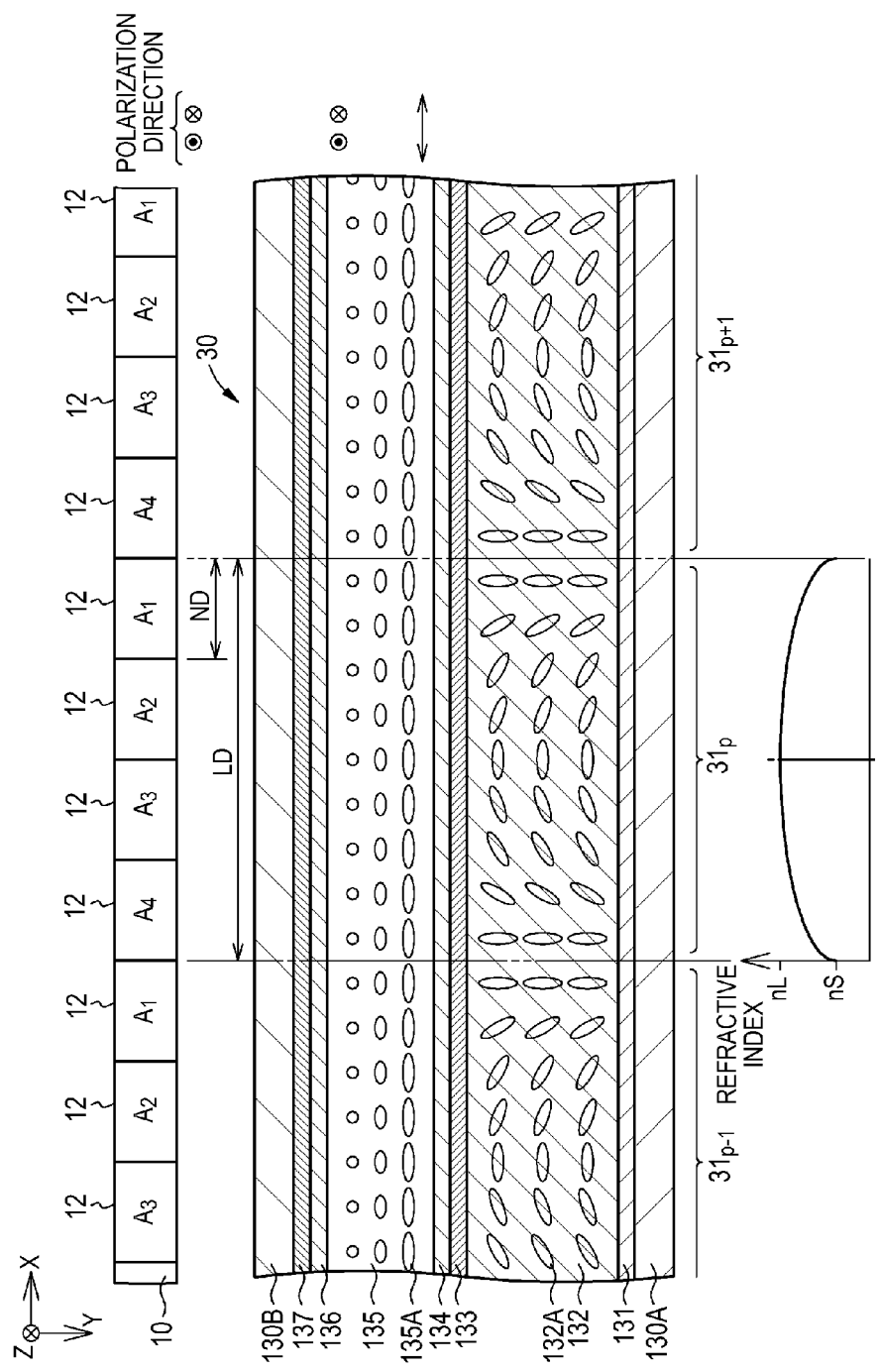

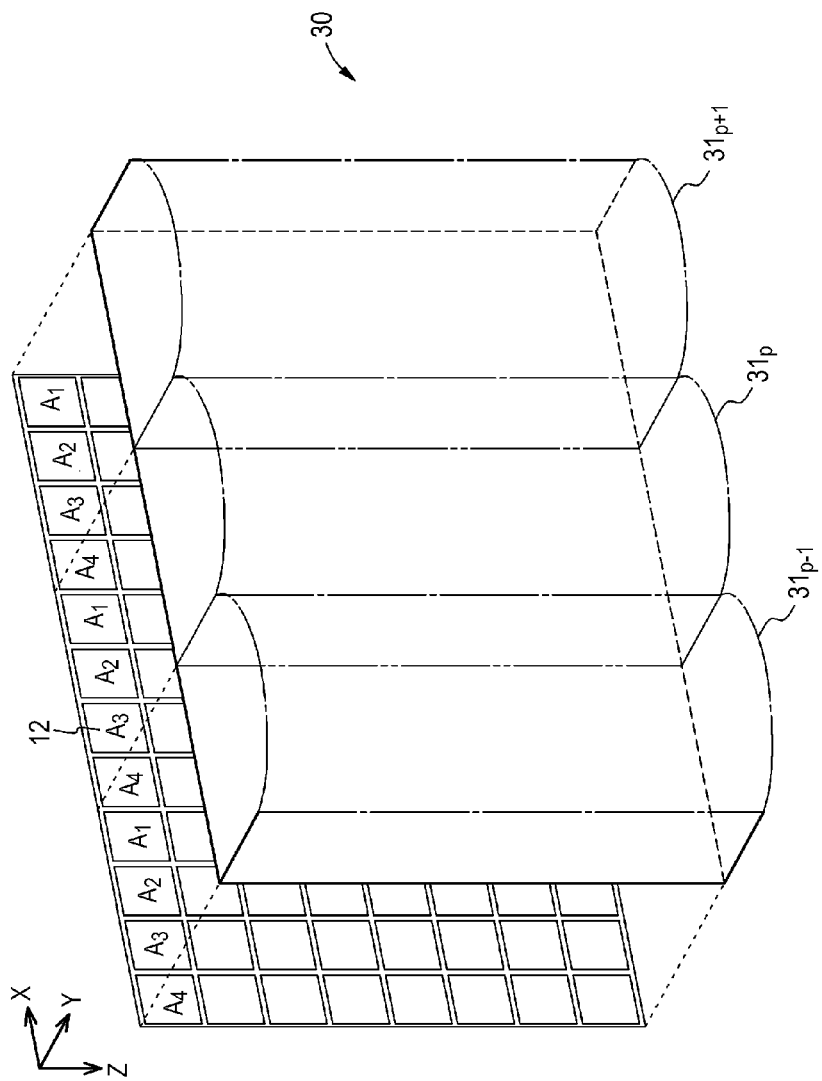

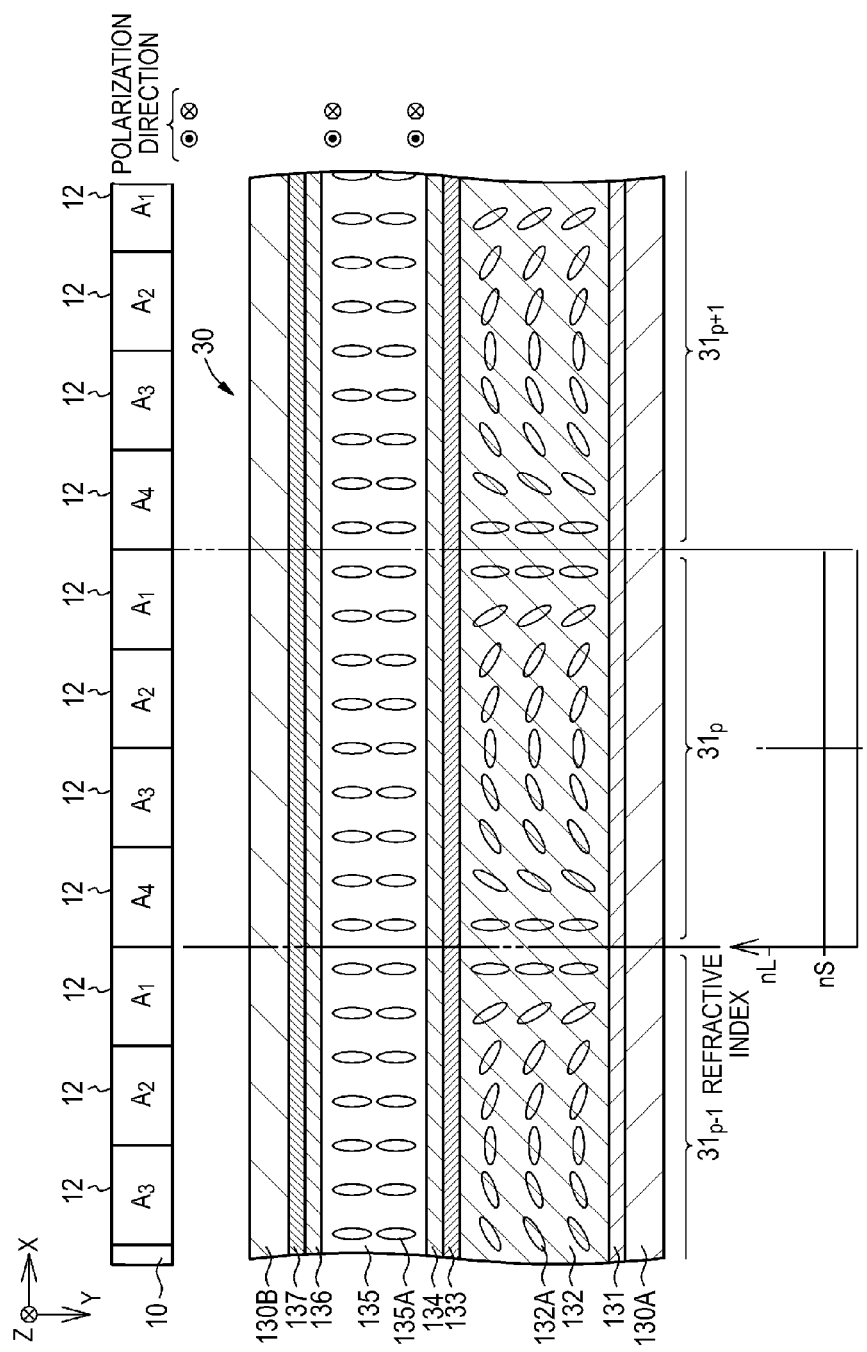

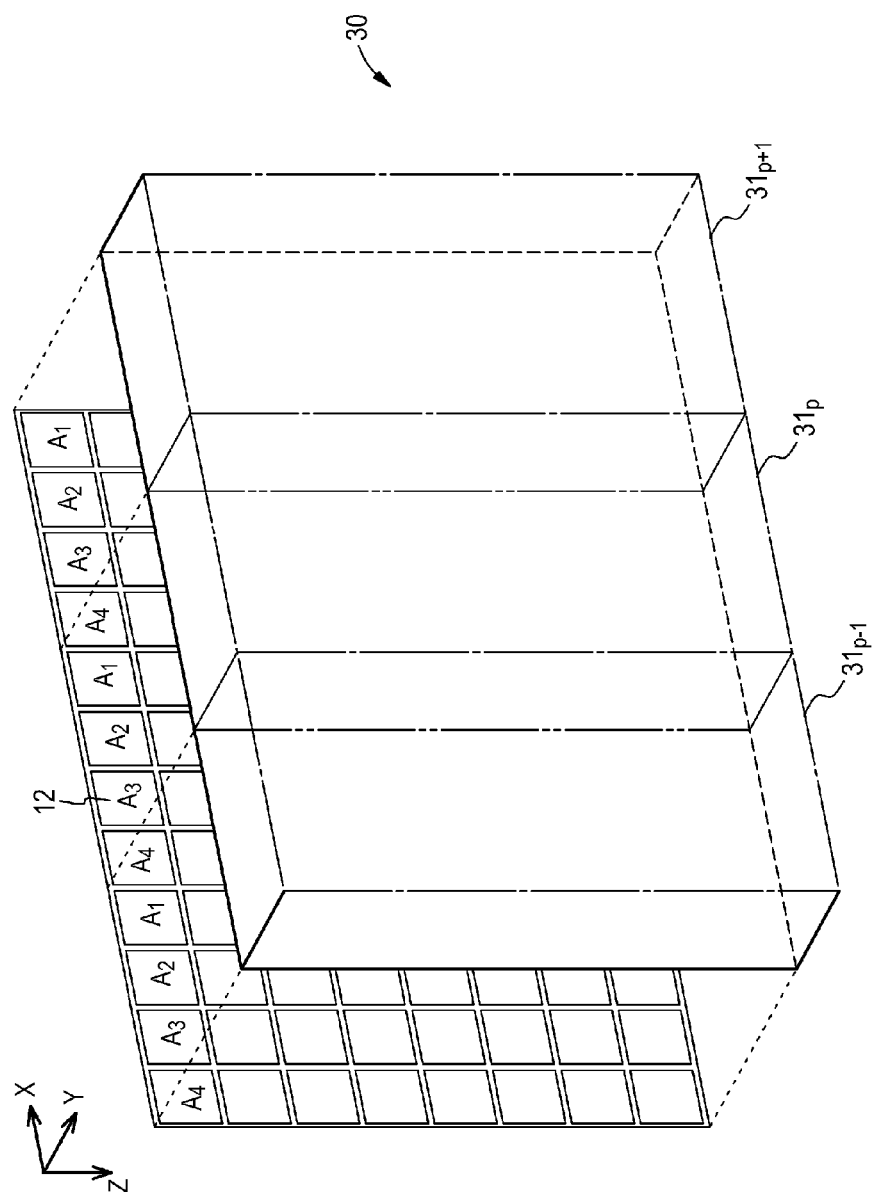

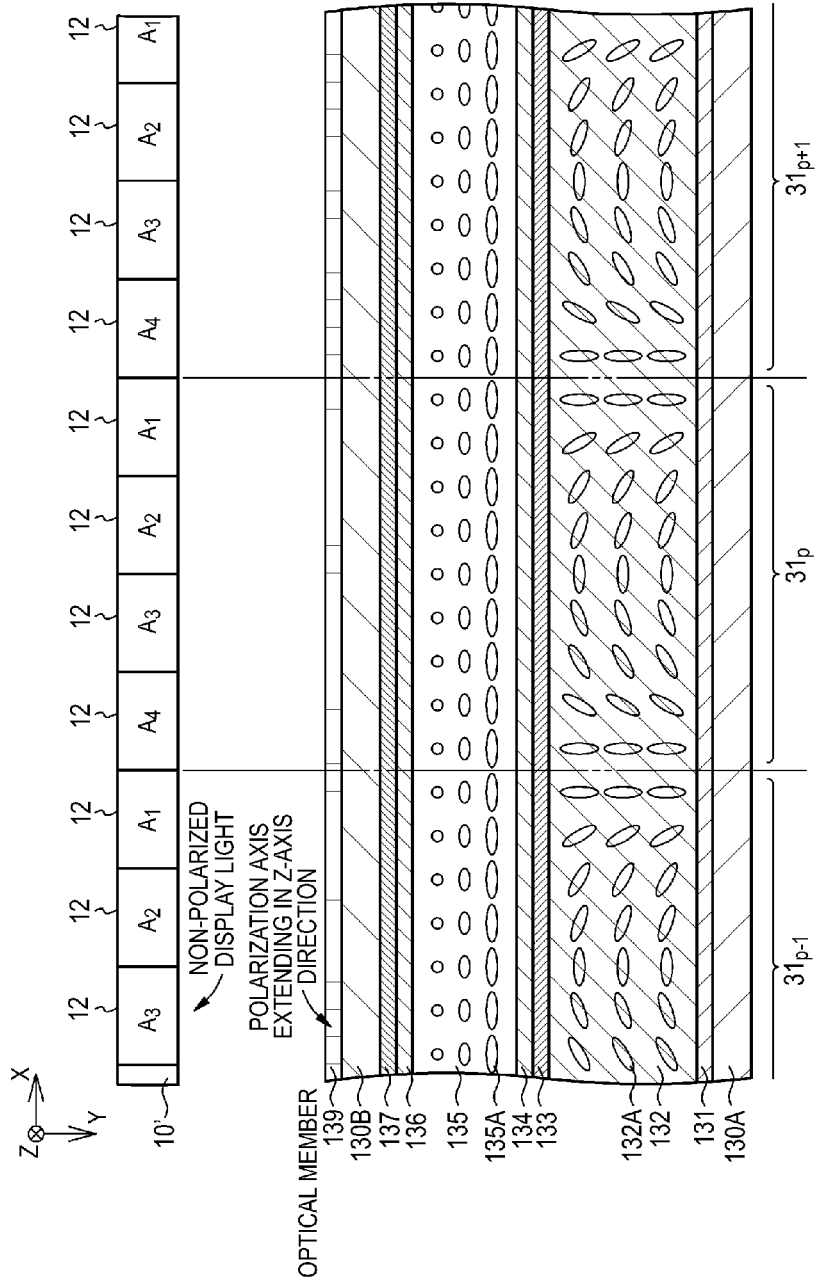

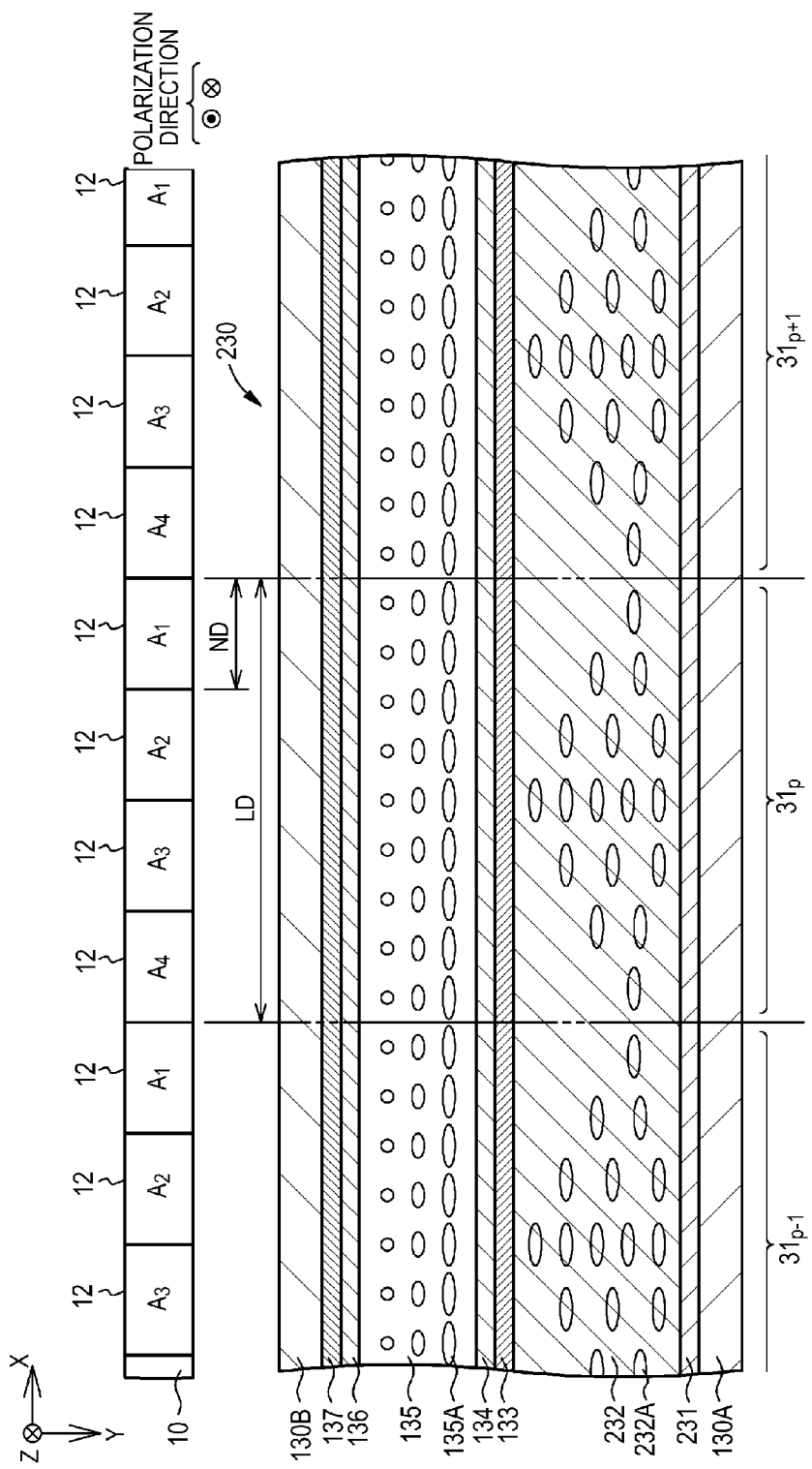

DISPLAY APPARATUS AND VARIABLE LENS ARRAY

FIELD

The present disclosure relates to a variable lens array. The present disclosure also relates to a display apparatus including the variable lens array.

BACKGROUND

There have been a variety of known display apparatus capable of displaying images for a plurality of viewpoints, for example, displaying images having parallax therebetween for stereoscopic vision. An example of a display apparatus of this type under development toward commercialization is a combination of a lenticular lens or any other similar lens array and a display unit that displays two-dimensional images.

FIGS. 16A and 16B are conceptual diagrams showing the operation of a display apparatus having a lens array formed of lens columns disposed between a display unit and an image viewer.

A group of light rays emitted from a group of pixels labeled with reference characters R1, R3, R5, R7, and R9 reach a viewpoint 2, as shown in FIG. 16A. Similarly, a group of light rays emitted from a group of pixels labeled with reference characters L2, L4, L6, L8, and L10 reach a viewpoint 1, as shown in FIG. 16B. In positions from the display unit set apart by a predetermined distance, an image at the viewpoint 1 and an image at the viewpoint 2 are thus viewed independently.

When the left and right eyes of the image viewer are located at the viewpoints 1 and 2 respectively, and the group of pixels labeled with reference characters L2, L4, L6, L8, and L10 and the group of pixels labeled with reference characters R1, R3, R5, R7, and R9 display an image for the left eye and an image for the right eye respectively, the image viewer recognizes the images stereoscopically.

On the other hand, it is preferable for such a display apparatus capable of displaying images for a plurality of viewpoints (displaying stereoscopic images, for example) to be also capable of readily displaying regular images (two-dimensional images) as necessary. In other words, a display apparatus of this type is desirably configured to be capable of switching a display mode between a mode for displaying stereoscopic images or other similar images and a mode for displaying regular images. When the lens columns of the lens array have variable refracting power, the mode for displaying stereoscopic images or other similar images can be switched to the mode for displaying regular images and vice versa.

For example, JP-A-7-72445 proposes a variable lens array capable of changing the refracting power of each lens column, as shown in FIG. 2 in JP-A-7-72445. The variable lens array described in JP-A-7-72445 has a structure in which a liquid crystal layer is disposed between a pair of transparent substrates each having a transparent electrode. In the variable lens array having the structure described above, each lens column is formed of a gradient index lens made of a liquid crystal material (hereinafter simply referred to as GRIN lens in some cases), and the refracting power of the lens column can be changed by changing the voltage between the pair of substrates.

SUMMARY

In the variable lens array shown in FIG. 2 in JP-A-7-72445, which forms an optical lens, the liquid crystal layer needs to be much thicker than a liquid crystal layer in a typical liquid crystal display panel, resulting in a slow response speed of the liquid crystal layer and hence a long period necessary to switch the display mode between the mode for displaying stereoscopic images or other similar images and the mode for displaying regular images.

It is therefore desirable to provide a variable lens array capable of shortening the period necessary to switch the display mode between the mode for displaying stereoscopic images or other similar images and the mode for displaying regular images. It is also desirable to provide a display apparatus including the variable lens array.

An embodiment of the present disclosure is directed to a display apparatus including a display unit that displays a two-dimensional image, and a variable lens array disposed to face the display unit, wherein the variable lens array includes a variable phase difference layer that receives incident linearly polarized light polarized in a first direction and allows the linearly polarized light polarized in the same direction to exit or allows linearly polarized light polarized in a second direction switched from the first direction and different therefrom to exit, and an optically anisotropic layer that receives the light having exited out of the variable phase difference layer and works as a lens array for one of the light polarized in the first direction and the light polarized in the second direction whereas working as a transparent layer for the other light.

Another embodiment of the present disclosure is directed to a variable lens array including a variable phase difference layer that receives incident linearly polarized light polarized in a first direction and allows the linearly polarized light polarized in the same direction to exit or allows linearly polarized light polarized in a second direction switched from the first direction and different therefrom to exit, and an optically anisotropic layer that receives the light having exited out of the variable phase difference layer and works as a lens array for one of the light polarized in the first direction and the light polarized in the second direction whereas working as a transparent layer for the other light.

The variable lens array according to the embodiment of the present disclosure or the variable lens array that forms the display apparatus according to the embodiments of the present disclosure includes the variable phase difference layer and the optically anisotropic layer described above. Since the variable phase difference layer can switch the polarization direction of light passing therethrough in a short period, the display mode can be switched in a short period between a mode for displaying stereoscopic images or other similar images and a mode for displaying regular images.

BRIEF DESCRIPTION OF THE DRAWINGS

FIGS. 4A to 4C are diagrammatic partial cross-sectional views of a first substrate and other components and describe a method for manufacturing the variable lens array;

FIGS. 5A and 5B are diagrammatic partial cross-sectional views of the first substrate and other components and describe the method for manufacturing the variable lens array after the process shown in FIG. 4C;

FIGS. 6A and 6B are diagrammatic partial cross-sectional views of the first substrate and other components and describe the method for manufacturing the variable lens array after the process shown in FIG. 5B;

FIG. 7 is a diagrammatic cross-sectional view of part of the variable lens array and part of a display unit that display stereoscopic images or other similar images;

FIG. 8 is a diagrammatic perspective view of part of the display unit and part of the variable lens array;

FIG. 9 is a diagrammatic cross-sectional view of part of the variable lens array and part of the display unit that display regular images;

FIG. 10 is a diagrammatic perspective view of part of the display unit and part of the variable lens array;

FIG. 11 is a diagrammatic cross-sectional view of a variable lens array according to a variation;

FIG. 12 is a diagrammatic cross-sectional view of part of a variable lens array according to a second embodiment;

DETAILED DESCRIPTION

Figure 1:
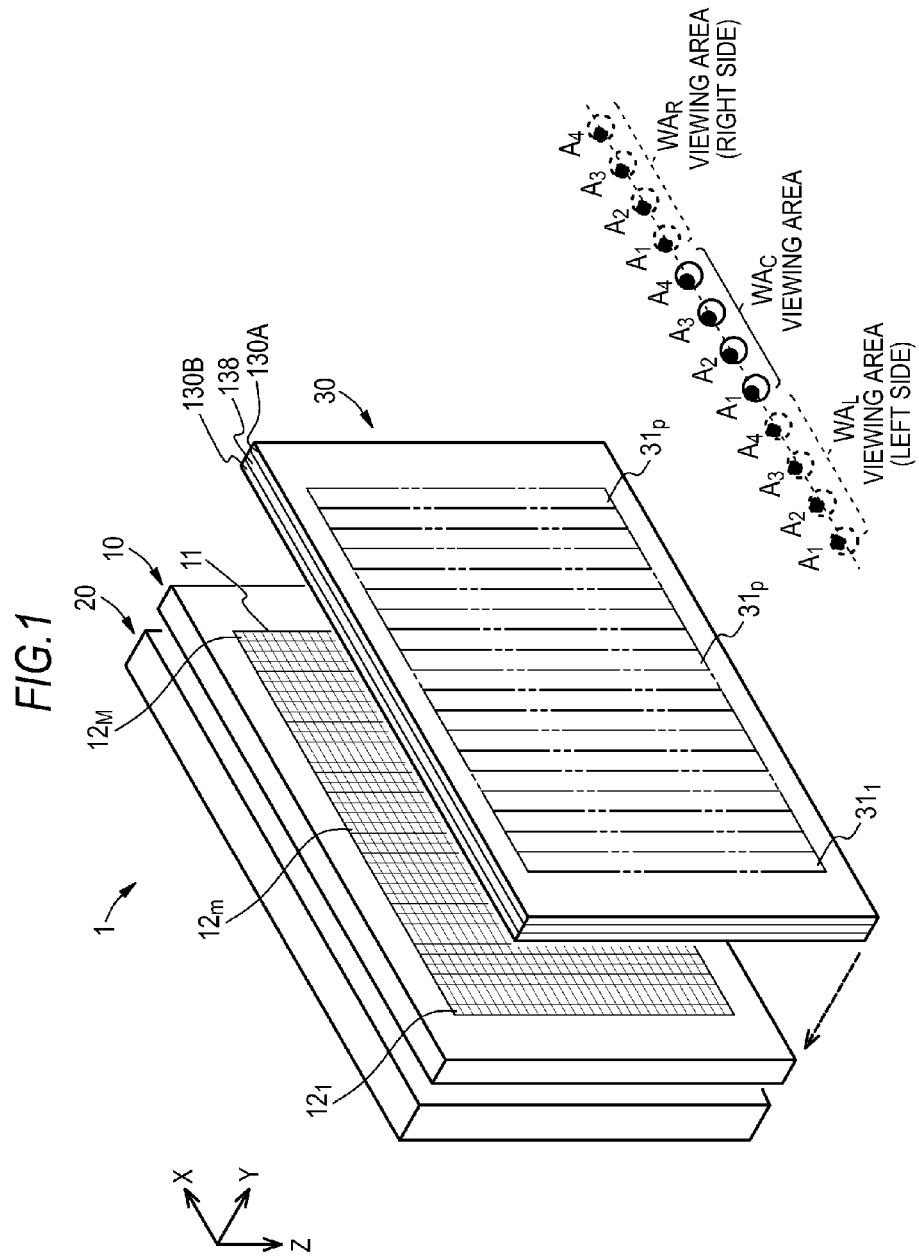
FIG. 1 is a diagrammatic exploded, perspective view of a display apparatus according to a first embodiment.

The present disclosure will be describe below based on embodiments with reference to the drawings. The present disclosure is not limited to the embodiments, and a variety of numeric values and materials in the embodiments are presented by way of example. In the following description, the same elements or elements having the same functions have the same reference characters, and no redundant description of these elements will be made. The description will be made in the following order.

1. Overall Description of Display Apparatus and Variable Lens Array According to Embodiments of Present Disclosure
2. First Embodiment
3. Second Embodiment (Others)

Overall Description of Display Apparatus and Variable Lens Array According to Embodiments of Present Disclosure In a variable lens array according to an embodiments of the present disclosure or a variable lens array used in a display apparatus according to an embodiments of the present disclosure (these variable lens arrays are hereinafter sometimes simply referred to as variable lens arrays according to the embodiment of the present disclosure), an optically anisotropic layer contains liquid crystalline compound molecules, and the liquid crystalline compound molecules are fixed in an orientation state in which the orientation direction thereof periodically changes in the optically anisotropic layer.

The variable lens array having the preferred configuration described above according to the embodiment of the present disclosure further includes an orientation film, and the optically anisotropic layer can be formed to be in contact with the orientation film. In this case, the orientation film undergoes an orientation process in which the orientation film is processed to be capable of periodically changing the orientation direction, and the optically anisotropic layer can be formed by applying a solution containing liquid crystalline compound molecules each having a reactive group onto the orientation film and then causing the reactive group to react so that the liquid crystalline compound molecules are fixed. Alternatively, the orientation film undergoes an orientation process in which the orientation film is processed to be capable of setting the orientation direction to be a fixed direction, and the optically anisotropic layer can be formed by applying a solution containing liquid crystalline compound molecules each having a photo-reactive group onto the orientation film, then causing the reactive group of the liquid crystalline compound molecules in predetermined areas set apart at certain intervals to react so that the liquid crystalline compound molecules in the predetermined areas are fixed, and increasing the temperature of the entire structure to cause the reactive group of the liquid crystalline compound molecules in portions other than the predetermined areas to react so that the liquid crystalline compound molecules in the portions are fixed.

The application of the solution containing liquid crystalline compound molecules each having a reactive group can be performed, for example, in spin coating, screen printing, or any other suitable known method.

The liquid crystalline compound molecules each having a reactive group can be made, for example, of a known calamitic liquid crystalline molecule. The fixation of liquid crystalline compound molecules can, for example, be performed in a polymerization reaction of a polymerizable group introduced into the liquid crystalline molecules. In the configuration in which a solution containing liquid crystalline compound molecules each having a reactive group is applied onto the orientation film and then the reactive group is allowed to react, the fixation of the liquid crystalline compound molecules can be performed, for example, in a thermal polymerization or photo-polymerization process. A preferable reactive group may be selected before use as appropriate from known reactive groups in accordance with the configuration of the variable lens array and a method for manufacturing the variable lens array.

The orientation film can be made of an organic compound, an inorganic compound, or any other suitable known material. The orientation process can, for example, be a rubbing process in which a surface of an organic compound layer or any other suitable layer is rubbed with a paper or fabric sheet or a light irradiation process in which the surface is irradiated with non-polarized or polarized light. The orientation process in which the orientation film is processed to be capable of periodically changing the orientation direction can be a light irradiation process using a mask. The orientation capability can be given by light irradiation to an orientation film made, for example, of a photosensitive organic compound.

For example, when a film made of an organic compound to which a photochemically reactive group is bonded is irradiated with non-polarized light, the photochemical reaction that occurs in molecules arranged in the direction in which the light travels differs from the photochemical reaction that occurs in the other molecules, resulting in anisotropy in the orientation of the molecules. Alternatively, when the film made of an organic compound to which a photochemically reactive group is bonded is irradiated with linearly polarized light, a selective reaction constrained along the polarization axis occurs, resulting in anisotropy in the orientation of the molecules. In view of the fact described above, the orientation characteristics of the orientation film made of the organic compound can be controlled by, when the film is irradiated with non-polarized light, setting the light irradiation direction as appropriate, whereas by, when the film is irradiated with linearly polarized light, using a mask or any other suitable component axis as appropriate that controls the direction of the polarization. The organic compound can, for example, be polyester, polyamide, polyimide, or any other suitable known material.

In the variable lens array having the variety of preferred configurations described above according to the embodiment of the present disclosure, a variable phase difference layer can be formed of a liquid crystal layer whose orientation state can be controlled by a voltage applied thereto. The material of which the liquid crystal layer is made and the mode in which the liquid crystal layer operates are not limited to specific ones as long as the polarization direction of light passing through the liquid crystal layer can be readily switched. A configuration in which the variable phase difference layer is a twisted nematic liquid crystal layer disposed between a pair of transparent common electrodes is advantageous in that it is not necessary to divide electrodes for controlling the liquid crystal layer and hence the configuration of the variable lens array can be simplified. In this case, since the liquid crystal layer can be as thin as a liquid crystal layer of a typical liquid crystal display panel, for example, about 5 [μm], the polarization direction can be switched in a short period. Further, since the liquid crystal material is degraded when a DC voltage is continuously applied to the liquid crystal layer, the polarity of the voltage applied to the liquid crystal layer may be sequentially reversed, as in a typical liquid crystal display panel.

The variable lens array having the variety of preferred configurations described above according to the embodiment of the present disclosure further includes a first substrate and a second substrate, and the variable phase difference layer and the optically anisotropic layer can be formed in succession between the first substrate and the second substrate.

A substrate used in the variable lens array, such as the first and second substrates, can be made of a material transparent to light. The material of which the substrate is made may, for example, be an acrylic resin, a polycarbonate resin (PC), an ABS resin, polymethylmethacrylate (PMMA), a polyarylate resin (PAR), a polyethylene terephthalate (PET) resin, and glass.

Each of the transparent common electrodes can be formed of a light-transmissive metal thin film or can be made of indium tin oxide (ITO), indium zinc oxide (IZO), or any other suitable transparent conductive material. The common electrodes can be formed by using vacuum evaporation, sputtering, or other physical vapor deposition (PVD) methods, a variety of chemical vapor deposition (CVD) methods, or other suitable known methods.

A display unit used in the display apparatus according to the embodiment of the present disclosure can be a liquid crystal display panel, an electroluminescence display panel, a plasma display panel, or any other suitable known display panel. The display unit may display information in monochrome or color.

In the embodiments described below, a transmissive monochromatic liquid crystal display panel is used as the display unit. In the description of the embodiments, the variable lens array is disposed between the display unit and an image viewer.

The liquid crystal display panel is formed, for example, of a front panel including a transparent common electrode, a rear panel including transparent pixel electrodes, and a liquid crystal material disposed between the front panel and the rear panel. The liquid crystal display panel does not necessarily operate in a specific mode. The liquid crystal display panel may be driven in what is called a TN mode or a VA or IPS mode.

The number of pixels M×N in the display unit is expressed by (M, N). Specific values of (M, N) can, for example, be VGA (640, 480), S-VGA (800, 600), XGA (1024, 768), APRC (1152, 900), S-XGA (1280, 1024), U-XGA (1600, 1200), HD-TV (1920, 1080), and Q-XGA (2048, 1536), and even (3840, 2160), (1920, 1035), (720, 480), (1280, 960), and several other types of resolution for displaying an image but not limited thereto.

A known illuminator can be used to illuminate the rear side of the transmissive display unit. The illuminator is not necessarily configured in a specific manner. The illuminator can be formed of a light source, a prism sheet, a diffuser sheet, a light guide plate, and other known members.

A drive circuit that drives the display unit and a drive circuit that drives the variable lens array can be formed of a variety of circuits. Each of the circuits can be formed of known circuit devices and other components.

A variety of conditions shown in the present specification may be exactly or substantially satisfied. A variety of types of design or manufacturing nonuniformity are permitted.

First Embodiment

A first embodiment according to the present disclosure relates to a display apparatus and a variable lens array.

FIG. 1 is a diagrammatic exploded, perspective view of a display apparatus according to the first embodiment.

A display apparatus 1 includes a display unit 10 that displays two-dimensional images and a variable lens array 30 so disposed that it faces the display unit 10, as shown in FIG. 1. It is assumed for convenience of description that a display area 11 of the display unit 10 is parallel to an X-Z plane and that an image viewer is present on the +y side (viewing area side).

The variable lens array 30 is so disposed that it faces the front side of the display unit 10 (image viewer side) and so held by a holding member (not shown) that the variable lens array 30 faces the display unit 10 with a predetermined design distance therebetween. A liquid crystal layer and other components are disposed between a first substrate 130A and a second substrate 130B of the variable lens array 30, as will be described later. Reference character 138 denotes a sealer. The variable lens array 30 will be described later in detail with reference to FIGS. 2 and 3, which will be described later.

An illuminator 20 that illuminates the display unit 10 with light is disposed on the rear side of the display unit 10. The illuminator 20 is formed of a light source, a prism sheet, a diffuser sheet, a light guide plate, and other members (not shown).

A first polarizer film (not shown) that polarizes light in the X direction is bonded to the rear surface of the display unit 10, and a second polarizer film (not shown) that polarizes light in the Z direction is bonded to the front surface of the display unit 10. The light traveling from the display area 11 toward the variable lens array 30 is therefore polarized in the Z direction.

Pixels 12 are arranged across the display area 11 of the display unit 10, specifically, M pixels 12 are arranged in the horizontal direction (X direction in FIG. 1) and N pixels 12 are arranged in the vertical direction (Z direction in FIG. 1). The pixels 12 along an m-th (m=1, 2, ..., M) column are expressed as pixels $12_m$.

In the variable lens array 30, P lens columns 31 extending in the vertical direction are arranged in the horizontal direction. A p-th (p=1, 2, ..., P) lens column 31 is expressed as a lens column $31_p$. The relationship of "P" with "M", which has been described above, will be described later.

The following description will be made by assuming for convenience of description that the number of viewpoints involved in viewing displayed stereoscopic images or any other similar images is four, viewpoints $A_1$, $A_2$, ..., $A_4$ present in a central viewing area $WA_C$ only by way of example. The number of viewing areas and the number of viewpoints can be set as appropriate in accordance with the design of the display apparatus 1. In an area $WA_L$ and an area $WA_R$ to the left and right of the central viewing area $WA_C$, images for viewpoints therein can also be viewed, for example, by preferably setting the positional relationship between the display unit 10 and the lens columns 31.

The display unit 10 is driven by a drive circuit (not shown). Specifically, the orientation directions of liquid crystal molecules in each of the pixels 12 are so controlled that two-dimensional images according to an external video signal are displayed. Further, the variable lens array 30 is so driven by another drive circuit (not shown) that the refracting power of each of the lens columns 31 is substantially switched, for example, between that for displaying stereoscopic images and that for displaying regular images. Specific operation of the variable lens array 30 will be described later in detail with reference to FIGS. 7 to 10, which will be described later.

The configuration of the variable lens array 30 will next be described with reference to FIGS. 2 and 3.

Figure 2:
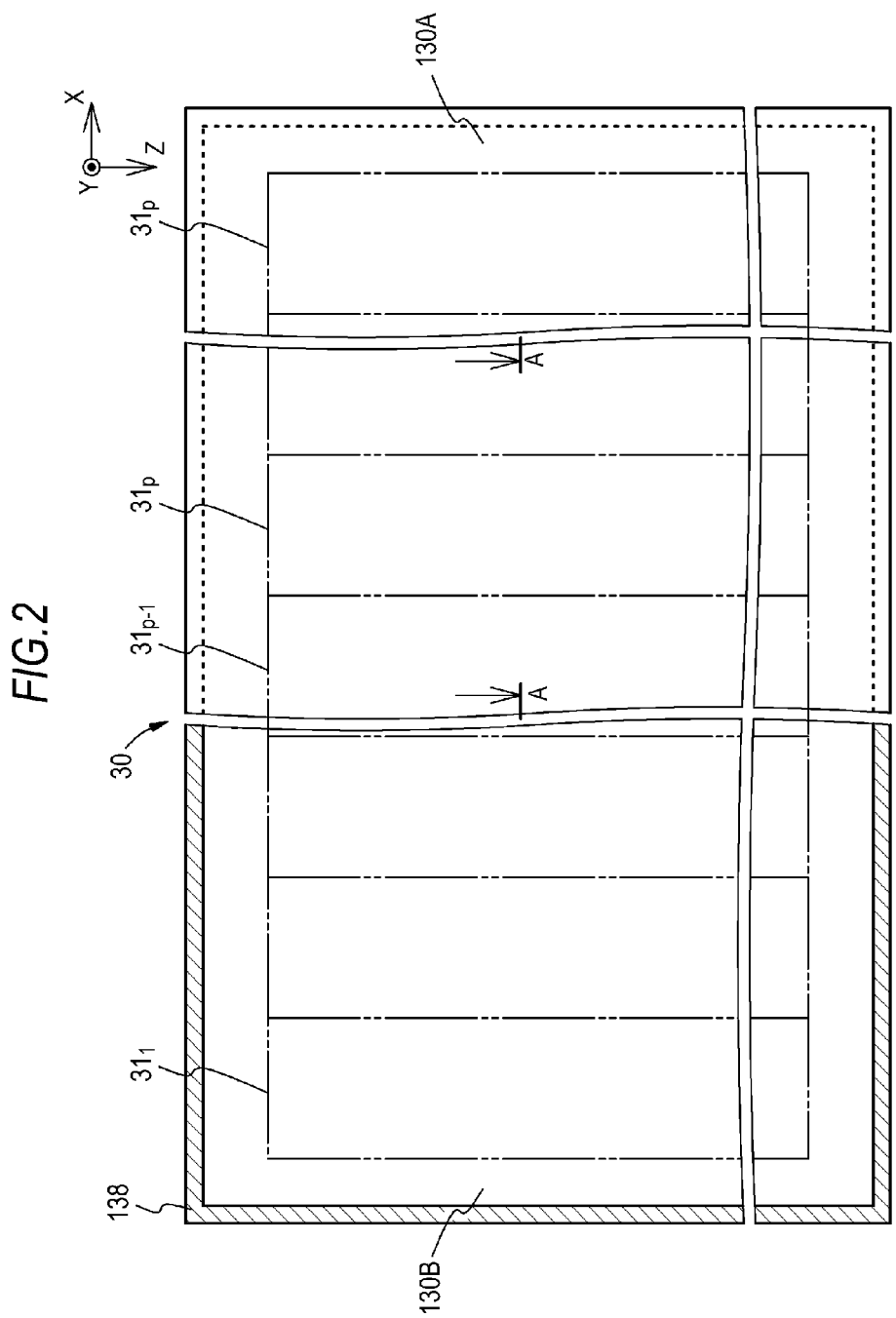
FIG. 2 is a diagrammatic plan view of the front side of a variable lens array.
Figure 16A:
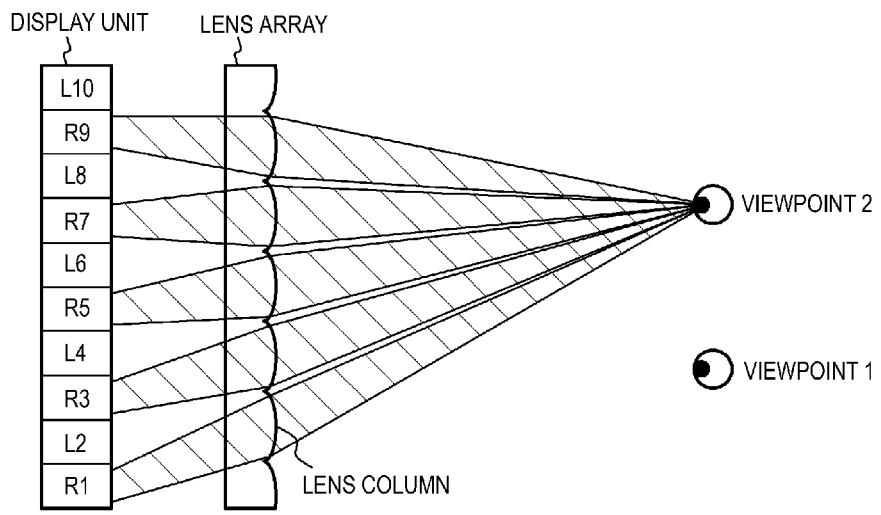
FIGS. 16A and 16B are conceptual diagrams showing the operation of a display apparatus having a lens array formed of lens columns disposed between a display unit and an image viewer.
Figure 16B:
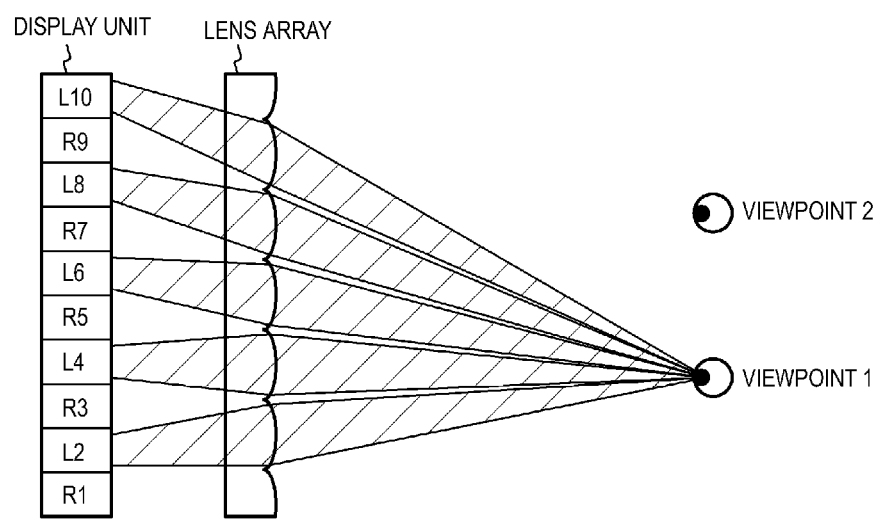

FIG. 2 is a diagrammatic plan view of the front side of the variable lens array. In FIG. 2, part of the first substrate 130A is cut away to show the portion behind the first substrate 130A. Further, the liquid crystal layer and other components are omitted for convenience of illustration in the portion where part of the first substrate 130A is cut away. FIG. 3 is a cross-sectional view taken along the line A-A shown in FIG. 2. FIG. 3 also diagrammatically shows pixels corresponding to lens columns 31. The same holds true for FIG. 12, FIGS. 16A and 16B, and other figures, which will be described later.

Figure 3:
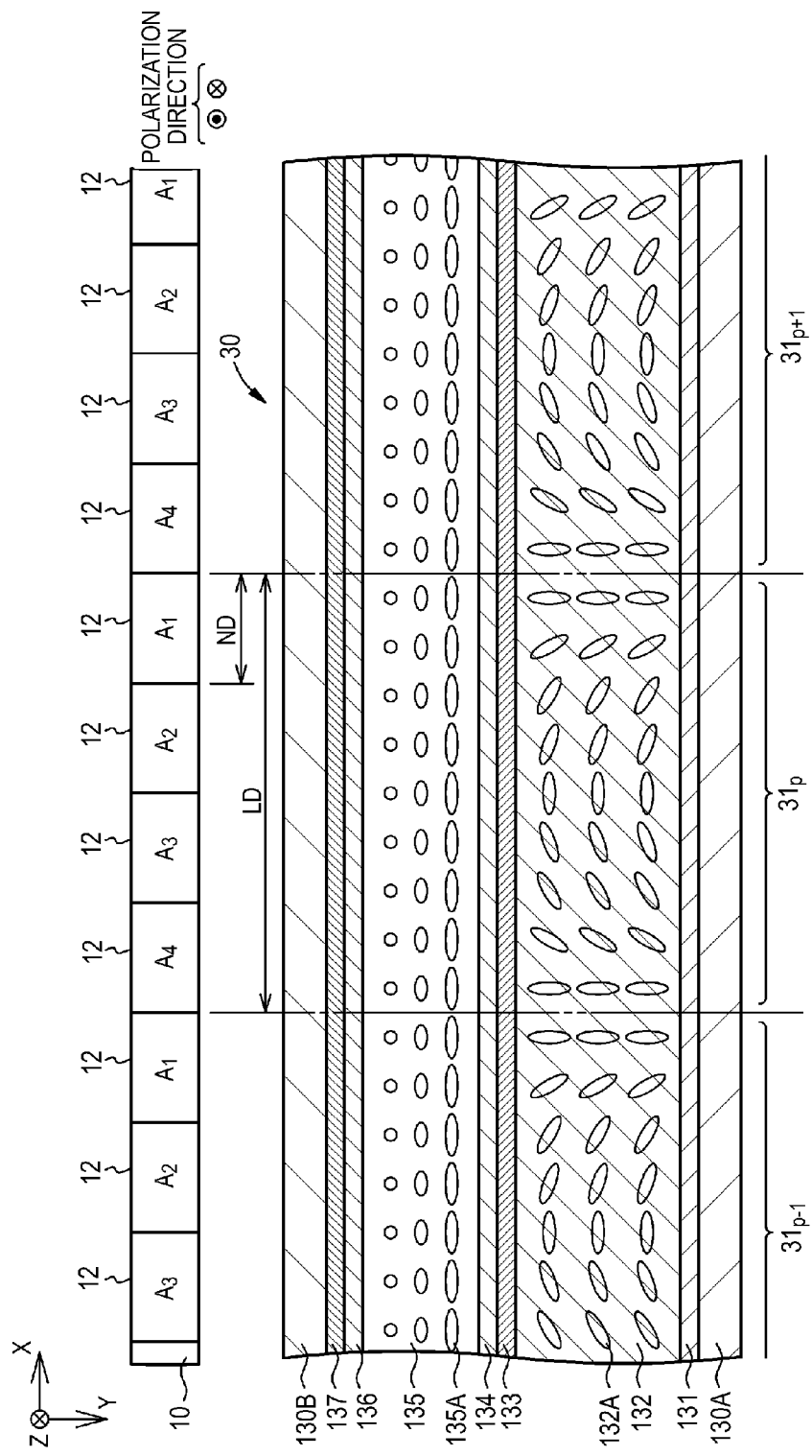
FIG. 3 is a cross-sectional view taken along the line A-A shown in FIG. 2.

The variable lens array 30 includes a variable phase difference layer 135 and an optically anisotropic layer 132, as shown in FIG. 3. The variable phase difference layer 135 receives incident linearly polarized light polarized in a first direction (Z direction in FIG. 3) and allows the linearly polarized light polarized in the same direction to exit or allows linearly polarized light polarized in a second direction (X direction in FIG. 3) switched from the first direction and different therefrom to exit, and the optically anisotropic layer 132 receives the light having exited out of the variable phase difference layer 135 and works as a lens array for one of the light polarized in the first direction and the light polarized in the second direction (light polarized in second direction in the description) whereas working as a transparent layer for the other light (light polarized in first direction in the description).

The variable lens array 30 further includes an orientation film 131. The orientation film 131 is formed on the inner surface of the first substrate 130A (surface facing optically anisotropic layer 132) and so formed that the optically anisotropic layer 132 is in contact with the orientation film 131. The optically anisotropic layer 132 contains liquid crystalline compound molecules 132A. The liquid crystalline compound molecules 132A are fixed in an orientation state in which the orientation direction thereof periodically changes with position in the optically anisotropic layer 132. To indicate that the orientation state of the liquid crystalline compound molecules 132A is fixed, an area where the orientation state is fixed is hatched with lines diagonally right up. The same holds true for the other drawings.

The orientation of the liquid crystalline compound molecules 132A will now be described. For convenience of description, consider an azimuth angle with respect to the X axis with the X-Z plane being a reference plane, and also consider a polar angle with respect to the Y axis.

The azimuth angle of the molecule axis (major axis) of each of the liquid crystalline compound molecules 132A is about zero degrees. In other words, the molecule axes of the liquid crystalline compound molecules 132A are oriented substantially in parallel to the X-Y plane.

On the other hand, the absolute value of the polar angle of the molecule axis of each of the liquid crystalline compound molecules 132A is about zero degrees at the boundary between the lens columns 31, increases in positions closer to a central portion of each of the lens columns 31, and becomes about 90 degrees in the central portion of the lens column 31. In other words, the liquid crystalline compound molecules 132A in a lens column $31_p$, for example, are oriented in the Y direction at the boundary between the lens column $31_p$ and a lens column $31_{p-1}$ shown in FIG. 3 and inclined rightward in FIG. 3 as the liquid crystalline compound molecules 132A approach the center of the lens column $31_p$. Similarly, the liquid crystalline compound molecules 132A in the lens column $31_p$ are oriented in the Y direction at the boundary between the lens column $31_p$ and a lens column $31_{p+1}$ shown in FIG. 3 and inclined leftward in FIG. 3 as the liquid crystalline compound molecules 132A approach the center of the lens column $31_p$. The liquid crystalline compound molecules 132A in the lens column $31_p$ are oriented in the X direction at the center of the lens column $31_p$.

The orientation film 131 undergoes an orientation process in which the orientation film is processed to be capable of periodically changing the orientation direction. The optically anisotropic layer 132 is formed by applying a solution containing the liquid crystalline compound molecules 132A each having a photo-reactive group on the orientation film 131 and then causing the reactive group to react so that the liquid crystalline compound molecules 132A are fixed.

The orientation process of the orientation film 131 will be described later in detail with reference to FIGS. 4A to 4C to FIG. 10, which will be described later.

The variable phase difference layer 135 is formed of a twisted nematic liquid crystal layer made of a positive nematic liquid crystal material and disposed between a pair of transparent common electrodes 133 and 137. The variable phase difference layer 135 is called a liquid crystal layer 135 in some cases.

The pair of common electrodes 133 and 137 are made of ITO or any other suitable transparent conductive material. One of the common electrodes, the common electrode 133, is formed on the entire surface of the optically anisotropic layer 132, and the other one of the common electrodes, the common electrode 137, is formed on the entire inner surface of the second substrate 130B (surface facing liquid crystal layer 135).

Orientation layers 134 and 136 made, for example, of polyamide are formed on the entire surfaces of the pair of common electrodes 133 and 137 that face the liquid crystal layer 135. The inner surface of the orientation layer 136 (surface facing liquid crystal layer 135) undergoes a rubbing process in which the inner surface is rubbed in the Z direction. Similarly, the inner surface of the orientation layer 134 (surface facing liquid crystal layer 135) undergoes a rubbing process in which the inner surface is rubbed in the X direction.

The orientation layers 134 and 136 define the direction of the molecule axis (major axis) of each liquid crystal molecule 135A when no difference in potential is present between the pair of common electrodes 133 and 137. In this state, the molecule axes of the liquid crystal molecules 135A (also called "director") located on the side where the common electrode 137 is present are oriented in the Z direction. The direction of the molecule axes gradually changes as the liquid crystal molecules 135A approach the common electrode 133, and the liquid crystal molecules 135A located on the side where the common electrode 133 is present are oriented in the X direction. The thickness of the liquid crystal layer 135 is maintained at a predetermined value by spacers or any other components (not shown).

As described above, the variable lens array 30 includes the first substrate 130A and the second substrate 130B, and the variable phase difference layer 135 and the optically anisotropic layer 132 are formed in succession between the first substrate 130A and the second substrate 130B. The same holds true for the other embodiments, which will be described later.

A single lens column 31 basically corresponds to the pixels 12 in four columns. Now, reference character LD denotes the horizontal interval between the liquid columns 31, and reference character ND denotes the horizontal interval between the pixels 12. The following expression is then satisfied: LD≈4×ND. For example, when the pixel interval ND is 0.3 [mm], the lens column interval LD is about 1.2 [mm]. Further, the relationship between "P" and "M" described above is P≈M/4.

A method for manufacturing the variable lens array 30 will be described below with reference to FIGS. 4A to 4C, 5A and 5B, and 6A and 6B. These figures are basically the same as the cross-sectional view taken along the line A-A shown in FIG. 3. In FIG. 6B, part of the components are omitted for convenience of illustration. It is further assumed in the following description that an orientation film having undergone an optical orientation process using non-polarized light orients the liquid crystalline compound molecules 132A in such a way that the major axes thereof are aligned with the light irradiation direction.

[Step 100] (see FIG. 4A)

The orientation film 131 made, for example, of a photosensitive polyimide material is first formed on the first substrate 130A by using a known method.

[Step 110] (see FIGS. 4B and 4C)

A mask 40 having slit-shaped openings 42 is then used to perform optical orientation of the orientation film 131.

The mask 40 has the slit-shaped openings 42 extending in the Z direction and a light blocker 41 between adjacent openings 42. The mask 40 can be made of a known material and formed by using a known method. The interval between the openings 42 in the X direction is the same as the interval LD between the lens columns 31 shown in FIG. 3. The width of each of the openings 42 in the X direction may be set at a preferable value as appropriate in accordance with the specifications of the variable lens array 30.

The mask 40 is so placed that it faces the orientation film 131 and portions of the orientation film 131 that correspond to the boundaries between the lens columns 31 correspond to the centers of the respective openings 42. The mask 40 is then irradiated with non-polarized light emitted from a light source (not shown) and traveling in the Y direction, and the areas of the orientation film 131 that correspond to the opening 42 (labeled with reference character $AL_1$) undergo optical orientation (see FIG. 4B).

The mask 40 is then so placed that it faces the orientation film 131 and portions of the orientation film 131 that correspond to central portions of the lens columns 31 correspond to the centers of the respective openings 42. The mask 40 is then irradiated with non-polarized light emitted from the light source (not shown) and traveling rightward and downward in FIG. 4C, and areas $AL_2$ of the orientation film 131 that are positioned to the left of the areas $AL_1$ undergo optical orientation. The mask 40 is then irradiated with non-polarized light emitted from the light source (not shown) and traveling leftward and downward in FIG. 4C, and areas $AL_3$ of the orientation film 131 that are positioned to the right of the areas $AL_1$ undergo optical orientation (see FIG. 4C).

[Step 120] (see FIG. 5A)

A solution containing the liquid crystalline compound molecules 132A each having a reactive group is then applied onto the orientation film 131 by using a known method. Reference character 132' denotes the applied solution layer. The orientation film 131 orients the liquid crystalline compound molecules 132A in the solution layer 132' in a predetermined manner.

[Step 130] (see FIG. 5B)

Thereafter, the entire surface of the resultant structure is irradiated, for example, with ultraviolet light that causes the reactive group to react so that the liquid crystalline compound molecules 132A are fixed. The optically anisotropic layer 132 is thus formed. The thickness of the optically anisotropic layer 132 is set, for example, at a value ranging from about 30 to 40 [μm] in the present description. The same hold true for the other embodiments, which will be described later.

[Step 140] (see FIG. 6A)

One of the common electrodes, the common electrode 133 (hereinafter also referred to as first common electrode in some cases) made, for example, of ITO is then formed on the entire surface of the optically anisotropic layer 132 by using a known method. The orientation layer 134 made, for example, of a polyimide material is then formed on the entire surface including the first common electrode 133 by using a known method, and the surface of the orientation layer 134 undergoes a rubbing process in which the surface is rubbed in the X direction.

[Step 150] (see FIG. 6B)

Thereafter, the other one of the common electrodes, the common electrode 137 (hereinafter also referred to as second common electrode in some cases) made, for example, of ITO is formed on the entire surface of the second substrate 130B by using a known method. The orientation layer 136 made, for example, of a polyimide material is then formed on the entire surface including the second common electrode 137 by using a known method, and the surface of the orientation layer 136 undergoes a rubbing process in which the surface is rubbed in the Z direction.

The first substrate 130A and the second substrate 130B having undergone the steps described above are then so placed that they face each other with the liquid crystal layer 135 interposed therebetween, and the peripheries of the substrates are sealed by using a thermosetting epoxy-based resin material or any other known suitable sealing material. The variable lens array 30 is thus provided.

The operation of the variable lens array 30 will next be described with reference to FIGS. 7 to 10. The operation of the variable lens array 30 that displays stereoscopic images or other similar images will first be described, and the operation of the variable lens array 30 that displays regular images will then be described.

FIG. 7 is a diagrammatic cross-sectional view of part of the variable lens array and part of the display unit that display stereoscopic images or other similar images. FIG. 8 is a diagrammatic perspective view of part of the display unit and part of the variable lens array.

When the display apparatus 1 is in operation, the same voltage (zero [volt], for example) is applied to the first common electrode 133 and the second common electrode 137. Since no potential difference is present between the first common electrode 133 and the second common electrode 137, the liquid crystal molecules 135A in the liquid crystal layer 135 are oriented as shown in FIG. 7.

Linearly polarized light polarized in the first direction (Z direction) is incident from the display unit 10 on the liquid crystal layer 135. Linearly polarized light polarized in the second direction (X direction) switched from the first direction and different therefrom then exits out of the liquid crystal layer 135.

In the optically anisotropic layer 132, the refractive index along the major axes of the liquid crystalline compound molecules 132A is greater than the refractive index along the minor axes thereof. Further, the molecule axes of the liquid crystalline compound molecules 132A are so oriented that they are substantially parallel to the X-Y plane. As a result, when the light incident from the liquid crystal layer 135 is polarized in the X direction (when electric field component of incident light is oriented in X direction), the refractive index in the optically anisotropic layer 132 is small at the periphery of each of the lens columns 31 and increases in positions closer to a central portion thereof, as indicated by the graph shown in FIG. 7. The optically anisotropic layer 132 thus works as a lens array for the light polarized in the second direction. The reference characters "nS" and "nL" shown in FIG. 7 represent the refractive indices along the minor and major axes of the liquid crystalline compound molecules 132A, respectively. It is noted that the graph shown in FIG. 7 is diagrammatically drawn and does not mean that the maximum and minimum of the refractive index are typically "nL" and "nS". This holds true for the graphs in the other drawings described later.

In this state, the wavefront of the light passing through each of the lens columns 31 travels faster in the periphery of the lens column 31 than portions closer to a central portion thereof. In other words, since the light travels in such a way that the wavefront thereof converges at a point, each of the lens columns 31 functions as a GRIN lens that forms a convex lens. The stripe-shaped lens columns 31 shown in FIG. 7 are optically equivalent to cylindrical convex lenses and hence operate as a lenticular lens (see FIG. 8).

Light fluxes that exit from the pixels 12 and form images for the viewpoints $A_1, A_2, \ldots, A_4$ are redirected when they pass through the lens columns 31 and oriented in a predetermined direction. As a result, images for predetermined viewpoints can be viewed in the viewing areas WA shown in FIG. 1.

FIG. 9 is a diagrammatic cross-sectional view of part of the variable lens array and part of the display unit that display regular images. FIG. 10 is a diagrammatic perspective view of part of the display unit and part of the variable lens array.

To display regular images, different voltages (0 [volt] and 15 [volt], for example) are applied to the first common electrode 133 and the second common electrode 137. In practice, to drive the liquid crystal layer 135 with an AC voltage, the polarity of the voltage is switched, for example, for each displayed frame. The following description will be made without consideration of the reversal of the polarity of the voltage for convenience of description.

In this state, the voltage between the first common electrode 133 and the second common electrode 137 is 15 [volt]. An electric field is therefore created between the second common electrode 137 and the first common electrode 133, and the liquid crystal molecules 135A are so oriented that the major axes thereof extend in the Y direction.

Linearly polarized light polarized in the first direction (Z direction) from the display unit 10 is incident on the liquid crystal layer 135. The linearly polarized light polarized in the same first direction then exits out of the liquid crystal layer 135.

The polarization direction of the linearly polarized light polarized in the same first direction (direction of electric field component of incident light) is perpendicular to the molecule axes of the liquid crystalline compound molecule 132A. The optically anisotropic layer 132 therefore simply functions as a transparent layer made of a material having the refractive index "nS" for the light polarized in the first direction (see FIG. 10). The display apparatus 1 operates as if it were provided with no lens array and allows the viewer to view regular images.

The first embodiment has been described above. Since the variable phase difference layer 135 can switch the polarization direction of light passing through the liquid crystal layer 135 in a short period, the display mode can be switched between the mode for displaying stereoscopic images or other similar images and the mode for displaying regular images in a short period.

In the configuration described above, when no electric field is applied to the liquid crystal layer 135, stereoscopic images or other similar images are displayed, whereas when an electric field is applied to the liquid crystal layer 135, regular images are displayed. The configuration described above is therefore suitable for an application in which stereoscopic images or other similar images are primarily displayed and regular images are secondarily displayed from a viewpoint of reducing power consumption necessary to drive the liquid crystal layer 135.

The display apparatus can be alternatively so configured that the light from the display area 11 of the display unit 10 toward the variable lens array 30 is polarized in the X direction instead of the Z direction and the rubbing directions of the orientation layers 134 and 136 are switched from each other in association with the change in the polarization direction.

Specifically, a first polarizer film (not shown) that polarizes light in the Z direction is bonded to the rear surface of the display unit 10, and a second polarizer film (not shown) that polarizes light in the X direction is bonded to the front surface of the display unit 10. The inner surface of the orientation layer 136 undergoes a rubbing process in which the inner surface is rubbed in the X direction, and the inner surface of the orientation layer 134 undergoes a rubbing process in which the inner surface is rubbed in the Z direction.

In the configuration described above, when no electric field is applied to the liquid crystal layer 135, regular images are displayed, whereas when an electric field is applied to the liquid crystal layer 135, stereoscopic images or other similar images are displayed. The configuration described above is therefore suitable for an application in which regular images are primarily displayed and stereoscopic images are secondarily displayed from a viewpoint of reducing power consumption necessary to drive the liquid crystal layer 135.

In the first embodiment, the display unit may alternatively be a self-luminous display unit, which, however, typically emits non-polarized light. In this case, for example, an optical member 139, such as a polarizer film that polarizes light in the X direction, may be disposed on the rear surface of the second substrate 130B (surface facing self-luminous display unit 10'), as shown in FIG. 11. The same holds true for the other embodiments.

Second Embodiment

A second embodiment according to the present disclosure also relates to a display apparatus and a variable lens array.

The second embodiment differs from the first embodiment in terms of the specifications of the orientation film and the optically anisotropic layer. Except the differences described above, the second embodiment has the same configuration as that of the first embodiment.

A diagrammatic exploded, perspective view of a display apparatus 2 used according to the second embodiment is similar to FIG. 1 but the term "display apparatus 1" is replaced with a term "display apparatus 2" and the term "variable lens array 30" is replaced with a term "variable lens array 230."

The configuration of the variable lens array 230 will be described with reference to FIG. 12.

FIG. 12 is a diagrammatic cross-sectional view of part of the variable lens array according to the second embodiment. Specifically, FIG. 12 is a cross-sectional view taken along the line A-A shown in FIG. 3, which is referred to in the first embodiment, but the term "variable lens array 30" is replaced with the term "variable lens array 230." In FIG. 12, reference character 231 denotes an orientation film, reference character 232 denotes an optically anisotropic layer, and reference character 232A denotes liquid crystalline compound molecules. FIG. 12 shows the orientation of the liquid crystal molecules 135A in a state in which no potential difference is present between the first common electrode 133 and the second common electrode 137 (in other words, when stereoscopic images or any other similar images are displayed).

The orientation film 231 undergoes an orientation process in which the orientation film is processed to be capable of setting the orientation direction to be a fixed direction (X direction in FIG. 12). The optically anisotropic layer 232, which will be described later in detain with reference to FIGS. 13A and 13B to FIG. 15, which will be described later, is formed by applying a solution containing the liquid crystalline compound molecules 232A each having a photo-reactive group on the orientation film 231, then causing the reactive group of the liquid crystalline compound molecules 232A in predetermined areas set apart at certain intervals to react so that the liquid crystalline compound molecules 232A in the predetermined areas are fixed, and increasing the temperature of the entire structure to cause the reactive group of the liquid crystalline compound molecules 232A in portions other than the predetermined areas to react so that the liquid crystalline compound molecules 232A in the portions are fixed.

The composition of the liquid crystalline compound molecules 232A is the same as that of the liquid crystalline compound molecules 132A in the first embodiment. Since the second embodiment differs from the first embodiment in terms of the method for fixing the orientation of the liquid crystalline compound molecules, the optically anisotropic layer and the liquid crystalline compound molecules in the second embodiment have reference characters different from those in the first embodiment.

A method for manufacturing the variable lens array 230 will be described below with reference to FIGS. 13A and 13B, 14A and 14B, and 15. These figures are similar to the cross-sectional view taken along the line A-A shown in FIG. 3 with the reference characters therein replaced as appropriate. A method for manufacturing the variable lens array 230 will be described below with reference to these figures.

Figure 13A:
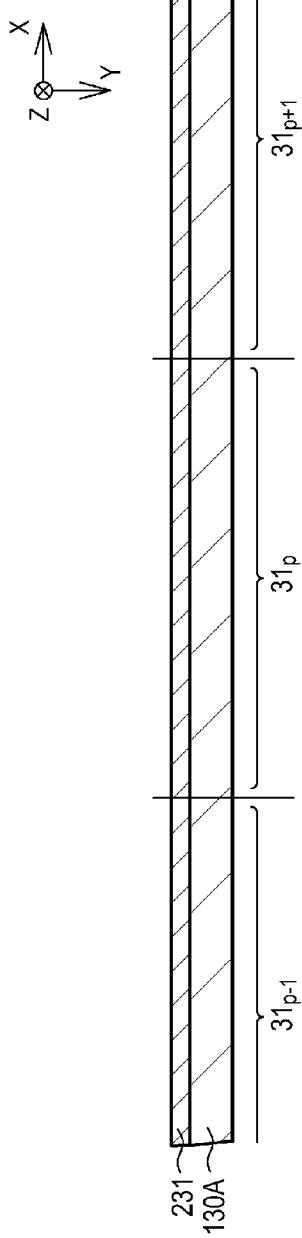
FIGS. 13A and 13B are diagrammatic partial cross-sectional views of a first substrate and other components and describe a method for manufacturing a variable lens array.

[Step 200] (see FIG. 13A)

The orientation film 231 made, for example, of a photosensitive polyimide material is first formed on the first substrate 130A by using a known method. The orientation film 231 undergoes a rubbing process in which the surface thereof is processed to be capable of setting the orientation direction to be a fixed direction (specifically, X direction in FIG. 13A) based on a known method.

Figure 13B:
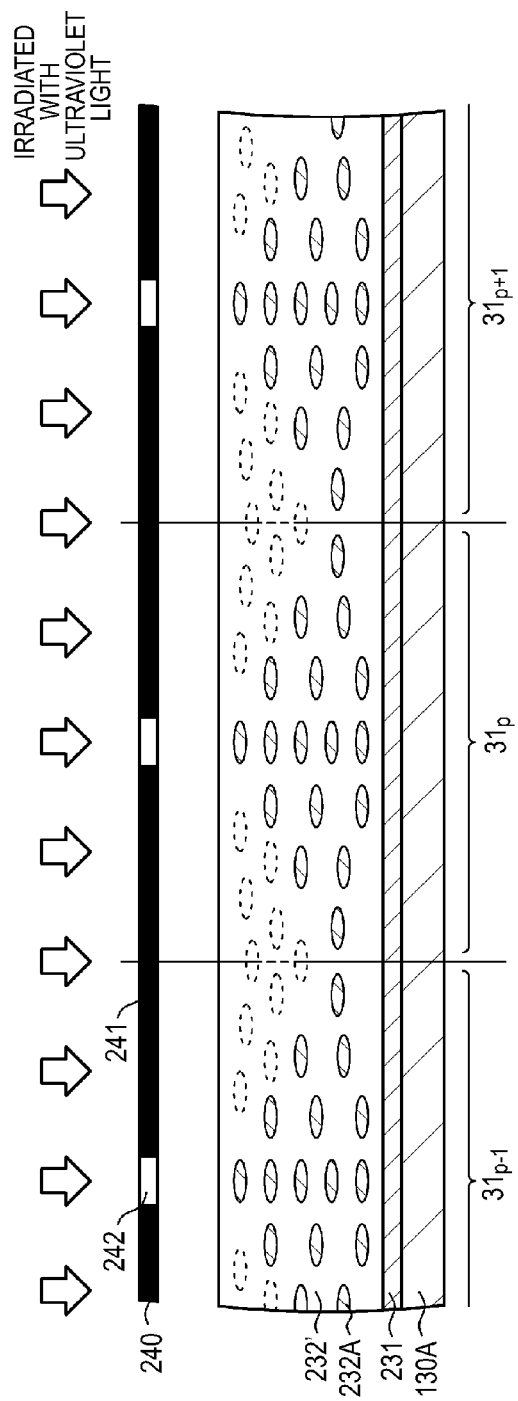

[Step 210] (see FIG. 13B)

A solution containing the liquid crystalline compound molecules 232A each having a reactive group is then applied on the orientation film 231 by using a known method. Reference character 232' denotes the solution layer. The orientation film 231 orients the liquid crystalline compound molecule 232A in the solution layer 232' in such a way that the molecule axes of the liquid crystalline compound molecule 232A are oriented in the X direction. A mask 240 having slit-shaped openings 242 is then used to cause the reactive group of the liquid crystalline compound molecule 232A in predetermined areas set apart at certain intervals to react so that the liquid crystalline compound molecules are fixed.

The mask 240 has slit-shaped openings 242 extending in the Z direction and a light blocker 241 between adjacent openings 242. The mask 240 can be made of a known material and formed by using a known method. The interval between the openings 242 in the X direction is the same as the interval LD between the lens columns 31 shown in FIG. 12. The width of each of the openings 242 in the X direction may be set at a preferable value as appropriate in accordance with the specifications of the variable lens array 230.

After the mask 240 is so placed that the slit-shaped openings 242 correspond to central portions of the lens columns 31, the mask is irradiated with ultraviolet light emitted from a light source (not shown) and traveling in the Y direction. In this process, the mask 240 is set apart from the solution layer 232' so that the ultraviolet light irradiated to the mask 240 also reaches the portions of the solution layer 232' that correspond to the light blockers 241 to some extent. The solution layer 232' is so irradiated with the ultraviolet light that the intensity of the ultraviolet light continuously changes and hence the degree of hardening of the liquid crystalline compound molecules 232A irradiated with the ultraviolet light also continuously changes. In FIG. 13B, liquid crystalline compound molecules 232A that have hardened are hatched, and liquid crystalline compound molecules 232A that have not hardened are drawn with broken lines.

Figure 14A:
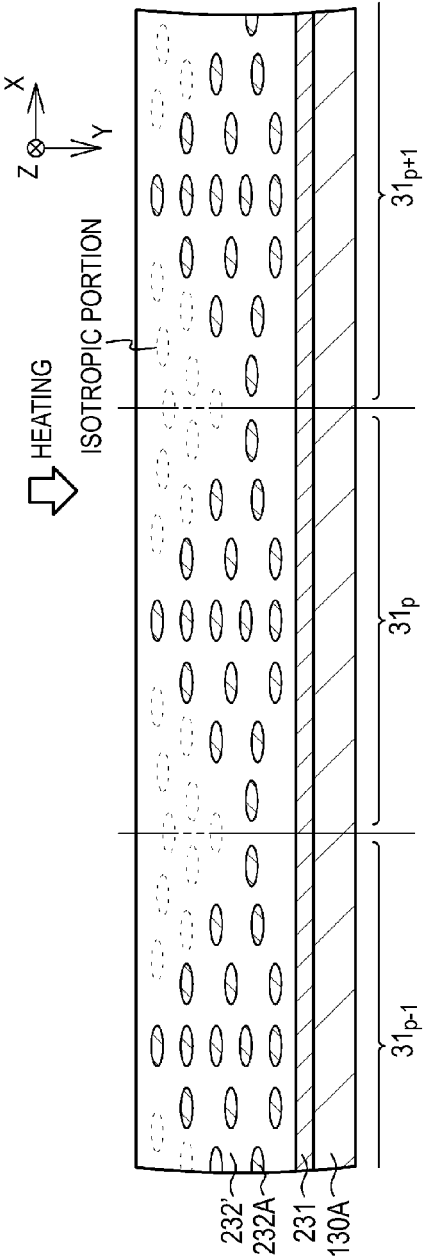
FIGS. 14A and 14B are diagrammatic partial cross-sectional views of the first substrate and other components and describe the method for manufacturing the variable lens array after the process shown in FIG. 13B.
Figure 14B:
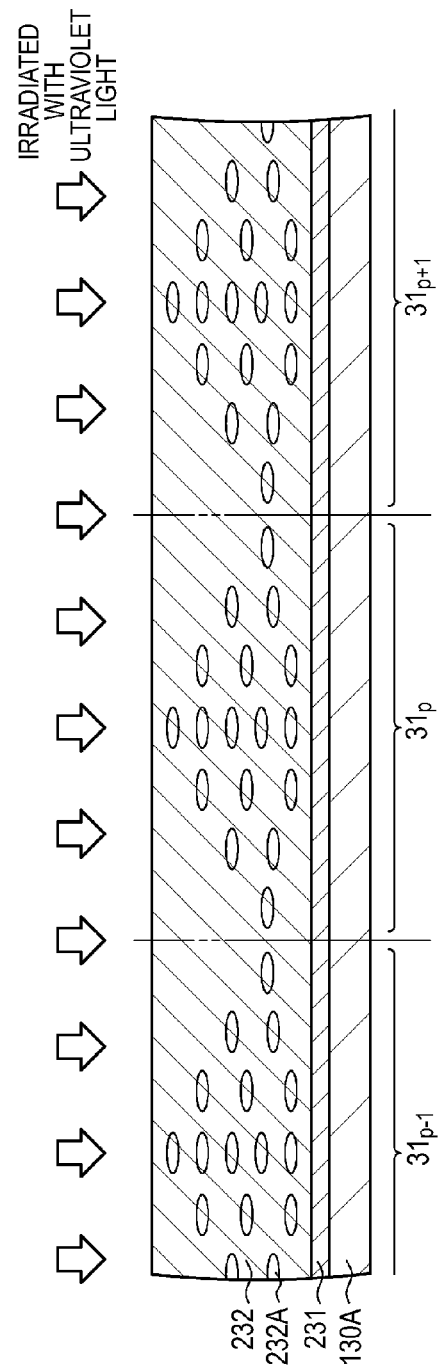

[Step 220] (see FIGS. 14A and 14B)

Figure 15:
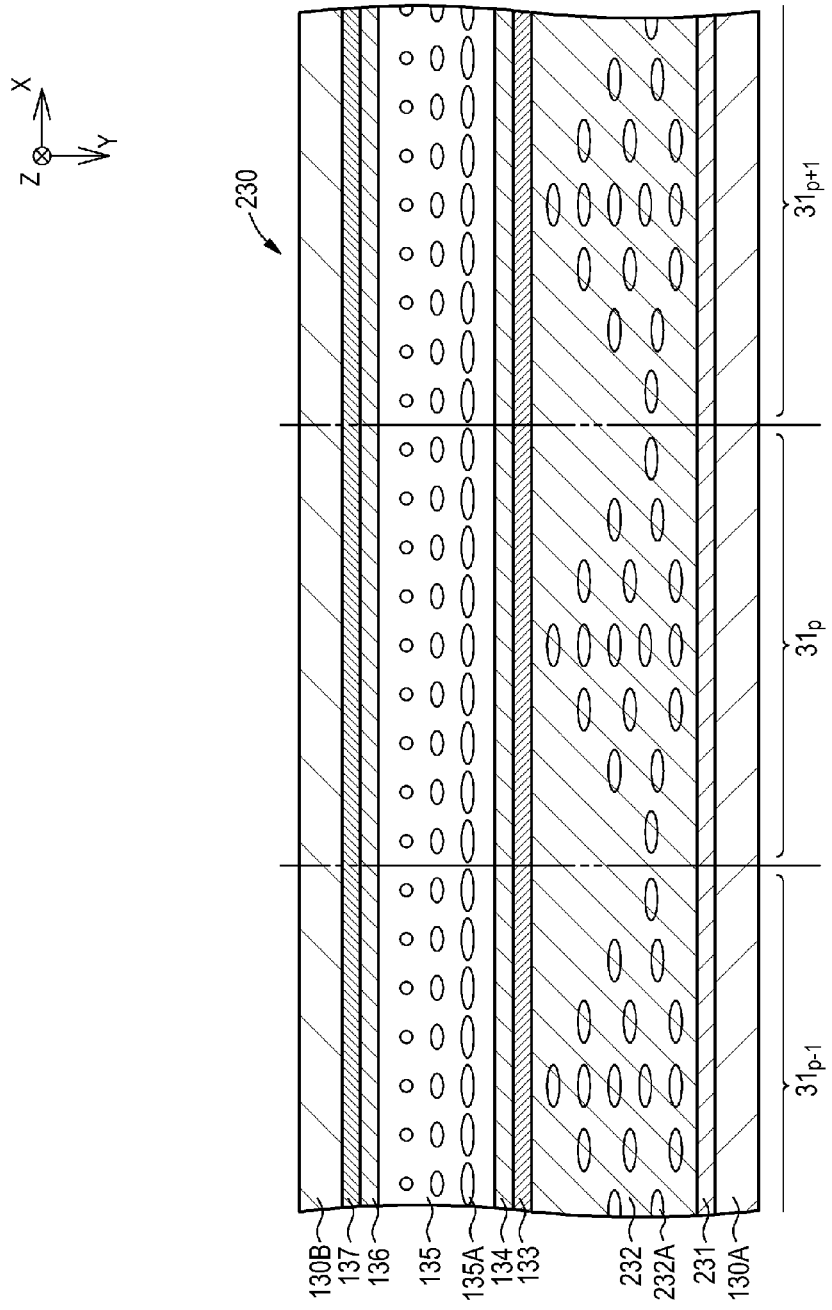
FIG. 15 is a diagrammatic partial cross-sectional view of the first substrate and other components and describe the method for manufacturing the variable lens array after the process shown in FIG. 14B.

The entire structure is then so heated that portions including the liquid crystal molecules 232A that have not hardened become isotropic (FIG. 14A). In this state, the entire surface is so irradiated with ultraviolet light that the reactive group reacts and the liquid crystalline compound molecules 232A are fixed (FIG. 14B). The optically anisotropic layer 232 is thus formed. In FIG. 14A, the liquid crystalline compound molecules 232A that have become isotropic are drawn with thin broken lines. In FIGS. 12, 14B, and 15, the liquid crystalline compound molecules 232A that have become isotropic are omitted for convenience of illustration.

[Step 230] (see FIG. 15)

The variable lens array 230 can be finally provided by carrying out the same step as [step 150] described in the first embodiment.

The method for manufacturing the variable lens array 230 has been described above. The operation of the variable lens array 230 that displays stereoscopic images or other similar images is basically the same as the operation described in the first embodiment with reference to FIGS. 7 and 8. The operation of the variable lens array 230 that displays regular images is basically the same as the operation described in the first embodiment with reference to FIGS. 9 and 10. No description of the operation of the variable lens array 230 will therefore be made.

The embodiments of the present disclosure have been specifically described above. The present disclosure is not limited to the embodiments described above, but a variety of variations based on the technical principles of the present disclosure can be implemented.

The technology of the present disclosure may also be implemented as the following configurations.

(1) A display apparatus including
a display unit that displays a two-dimensional image, and
a variable lens array disposed to face the display unit,
wherein the variable lens array includes
a variable phase difference layer that receives incident linearly polarized light polarized in a first direction and allows the linearly polarized light polarized in the same direction to exit or allows linearly polarized light polarized in a second direction switched from the first direction and different therefrom to exit, and
an optically anisotropic layer that receives the light having exited out of the variable phase difference layer and works as a lens array for one of the light polarized in the first direction and the light polarized in the second direction whereas working as a transparent layer for the other light.

(2) The display apparatus described in (1),
wherein the optically anisotropic layer contains liquid crystalline compound molecules, and
the liquid crystalline compound molecules are fixed in an orientation state in which the orientation direction thereof periodically changes in the optically anisotropic layer.

(3) The display apparatus described in (2),
wherein the variable lens array further including an orientation film, and
the optically anisotropic layer is formed to be in contact with the orientation film.

(4) The display apparatus described in (3),
wherein the orientation film undergoes an orientation process in which the orientation film is processed to be capable of periodically changing the orientation direction, and
the optically anisotropic layer is formed by applying a solution containing liquid crystalline compound molecules each having a reactive group on the orientation film and then causing the reactive group to react so that the liquid crystalline compound molecules are fixed.

(5) The display apparatus described in (3),
wherein the orientation film undergoes an orientation process in which the orientation film is processed to be capable of setting the orientation direction to be a fixed direction, and
the optically anisotropic layer is formed by applying a solution containing liquid crystalline compound molecules each having a photo-reactive group on the orientation film, then causing the reactive group of the liquid crystalline compound molecules in predetermined areas set apart at certain intervals to react so that the liquid crystalline compound molecules in the predetermined areas are fixed, and increasing the temperature of the entire structure to cause the reactive group of the liquid crystalline compound molecules in portions other than the predetermined areas to react so that the liquid crystalline compound molecules in the portions are fixed.

(6) The display apparatus described in any of (1) to (5),
wherein the variable phase difference layer is formed of a twisted nematic liquid crystal layer disposed between a pair of transparent common electrodes.

(7) The display apparatus described in any of (1) to (6),
wherein the variable lens array further includes a first substrate and a second substrate, and
the variable phase difference layer and the optically anisotropic layer are formed in succession between the first substrate and the second substrate.

(8) A variable lens array including
a variable phase difference layer that receives incident linearly polarized light polarized in a first direction and allows the linearly polarized light polarized in the same direction to exit or allows linearly polarized light polarized in a second direction switched from the first direction and different therefrom to exit, and
an optically anisotropic layer that receives the light having exited out of the variable phase difference layer and works as a lens array for one of the light polarized in the first direction and the light polarized in the second direction whereas working as a transparent layer for the other light.

The present disclosure contains subject matter related to that disclosed in Japanese Priority Patent Application JP 2011-142783 filed in the Japan Patent Office on Jun. 28, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A variable lens array comprising:
a variable phase difference layer that receives incident linearly polarized light polarized in a first direction and allows the linearly polarized light polarized in the same direction to exit or allows linearly polarized light polarized in a second direction switched from the first direction and different therefrom to exit; and
an optically anisotropic layer that receives the light having exited out of the variable phase difference layer and works as a lens array for one of the light polarized in the first direction and the light polarized in the second direction whereas working as a transparent layer for the other light,
wherein the variable lens array further includes a first substrate and a second substrate, and
the variable phase difference layer and the optically anisotropic layer are formed in succession between the first substrate and the second substrate.

2. A variable lens array comprising:
a variable phase difference layer that receives incident linearly polarized light in a first direction and allows the linearly polarized light polarized in the same direction to exit or allows linearly polarized light polarized in a second direction switched from the first direction and different therefrom to exit; and
an optically anisotropic layer that receives the light having exited out of the variable phase difference layer and works as a lens array for one of the light polarized in the first direction and the light polarized in the second direction whereas working as a transparent layer for the other light,
wherein the optically anisotropic layer contains liquid crystalline compound molecules, the liquid crystalline compound molecules are fixed in an orientation state in which the orientation direction thereof periodically changes in the optically anisotropic layer, the variable lens array further including an orientation film, the optically anisotropic layer is formed to be in contact with the orientation film, the orientation film undergoes an orientation process in which the orientation film is processed to be capable of periodically changing the orientation direction, and the optically anisotropic layer is formed by applying a solution containing liquid crystalline compound molecules each having a reactive group on the orientation film, then causing the reactive group of the liquid crystalline compound molecules in predetermined areas set apart at certain intervals to react so that the liquid crystalline compound molecules in the predetermined areas are fixed, and increasing the temperature of the entire structure to cause the reactive group of the liquid crystalline compound molecules in portions other than the predetermined areas to react so that the liquid crystalline compound molecules in the portions are fixed.

3. A variable lens array comprising:

a variable phase difference layer that receives incident linearly polarized light polarized in a first direction and allows the linearly polarized light polarized in the same direction to exit or allows linearly polarized light polarized in a second direction switched from the first direction and different therefrom to exit; and an optically anisotropic layer that receives the light having exited out of the variable phase difference layer and works as a lens array for one of the light polarized in the first direction and the light polarized in the second direction whereas working as a transparent layer for the other light, wherein the optically anisotropic layer contains liquid crystalline compound molecules, the liquid crystalline compound molecules are fixed in an orientation state in which the orientation direction thereof periodically changes in the optically anisotropic layer, the variable lens array further including an orientation film, the optically anisotropic layer is formed to be in contact with the orientation film, the orientation film undergoes an orientation process in which the orientation film is processed to be capable of periodically changing the orientation direction, and the optically anisotropic layer is formed by applying a solution containing liquid crystalline compound molecules each having a reactive group on the orientation film and then causing the reactive group to react so that the liquid crystalline compound molecules are fixed.

4. A display apparatus comprising:

a display unit that displays a two-dimensional image; and a variable lens array disposed to face the display unit, wherein the variable lens array includes a variable phase difference layer that receives incident linearly polarized light polarized in a first direction and allows the linearly polarized light polarized in the same direction to exit or allows linearly polarized light polarized in a second direction switched from the first direction and different therefrom to exit, and an optically anisotropic layer that receives the light having exited out of the variable phase difference layer and works as a lens array for one of the light polarized in the first direction and the light polarized in the second direction whereas working as a transparent layer for the other light, wherein the optically anisotropic layer contains liquid crystalline compound molecules, the liquid crystalline compound molecules are fixed in an orientation state in which the orientation direction thereof periodically changes in the optically anisotropic layer, the variable lens array further including an orientation film, the optically anisotropic layer is formed to be in contact with the orientation film, the orientation film undergoes an orientation process in which the orientation film is processed to be capable of periodically changing the orientation direction, and the optically anisotropic layer is formed by applying a solution containing liquid crystalline compound molecules each having a reactive group on the orientation film and then causing the reactive group to react so that the liquid crystalline compound molecules are fixed.

5. The display apparatus according to claim 4, wherein the variable phase difference layer is formed of a twisted nematic liquid crystal layer disposed between a pair of transparent common electrodes.

6. A display apparatus, comprising:

a display unit that displays a two-dimensional image; and a variable lens array disposed to face the display unit, wherein the variable lens array includes a variable phase difference layer that receives incident linearly polarized light polarized in a first direction and allows the linearly polarized light polarized in the same direction to exit or allows linearly polarized light polarized in a second direction switched from the first direction and different therefrom to exit, and an optically anisotropic layer that receives the light having exited out of the variable phase difference layer and works as a lens array for one of the light polarized in the first direction and the light polarized in the second direction whereas working as a transparent layer for the other light, wherein the optically anisotropic layer contains liquid crystalline compound molecules, the liquid crystalline compound molecules are fixed in an orientation state in which the orientation direction thereof periodically changes in the optically anisotropic layer, the variable lens array further including an orientation film, the optically anisotropic layer is formed to be in contact with the orientation film, the orientation film undergoes an orientation process in which the orientation film is processed to be capable of setting the orientation direction to be a fixed direction, and the optically anisotropic layer is formed by applying a solution containing liquid crystalline compound molecules each having a photo-reactive group on the orientation film, then causing the reactive group of the liquid crystalline compound molecules in predetermined areas set apart at certain intervals to react so that the liquid crystalline compound molecules in the predetermined areas are fixed, and increasing the temperature of the entire structure to cause the reactive group of the liquid crystalline compound molecules in portions other than the predetermined areas to react so that the liquid crystalline compound molecules in the portions are fixed.

7. A display apparatus, comprising:

a display unit that displays a two-dimensional image; and a variable lens array disposed to face the display unit,
wherein the variable lens array includes
a variable phase difference layer that receives incident linearly polarized light polarized in a first direction and allows the linearly polarized light polarized in the same direction to exit or allows linearly polarized light polarized in a second direction switched from the first direction and different therefrom to exit, and
an optically anisotropic layer that receives the light having exited out of the variable phase difference layer and works as a lens array for one of the light polarized in the first direction and the light polarized in the second direction whereas working as a transparent layer for the other light,
wherein the variable lens array further includes a first substrate and a second substrate, and
the variable phase difference layer and the optically anisotropic layer are formed in succession between the first substrate and the second substrate.

* * * * *